J. I. AYER.
ELECTRIC HEATER COMBINATION.
APPLICATION FILED JAN. 13, 1910.

968,441.

Patented Aug. 23, 1910.

Witnesses:
M. J. Spalding
Edward Maxwell

Inventor:
James I. Ayer,
by Geo. W. Maxwell, atty.

UNITED STATES PATENT OFFICE.

JAMES I. AYER, OF CAMBRIDGE, MASSACHUSETTS, ASSIGNOR TO SIMPLEX ELECTRIC HEATING COMPANY, OF CAMBRIDGE, MASSACHUSETTS, A CORPORATION OF MASSACHUSETTS.

ELECTRIC-HEATER COMBINATION.

968,441.  Specification of Letters Patent.  Patented Aug. 23, 1910.

Application filed January 13, 1910. Serial No. 537,847.

*To all whom it may concern:*

Be it known that I, JAMES I. AYER, a citizen of the United States, residing at Cambridge, in the county of Middlesex and State of Massachusetts, have invented an Improvement in Electric-Heater Combinations, of which the following description, in connection with the accompanying drawings, is a specification, like letters on the drawings representing like parts.

In connection with electric heated utensils for the kitchen and similar purposes one of the drawbacks is due to the expense of an outfit, it being common to have suitable electric heating wires in the bottom of each utensil or to have a number of heaters provided for the individual utensils and a large stove on which the utensils may be placed.

Accordingly it is the object of my invention to obviate all the well recognized objections to the above by providing a simple and preferably portable stove or heating plate having a peripheral flange, combined with a plurality of utensils having a special bottom fitting said flange whereby the said plurality of utensils may be placed together on the heater in such relation as to conduct the heat to the best advantage while permitting the removal of either of the utensils either wholly or partially from the heater, which, when exposed by said removal, can be used for various other purposes, such as toasting, broiling, etc.

The constructional details and further advantages of my invention will be pointed out in the course of the following description taken with reference to the accompanying drawings, in which—

Figure 1:
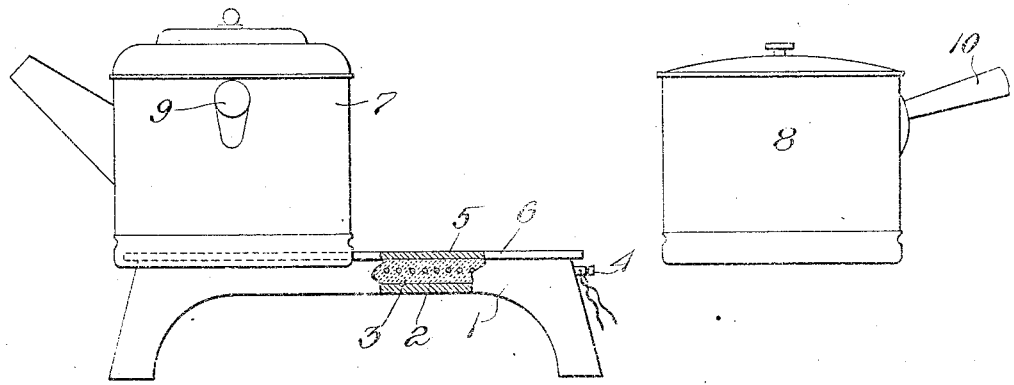
Figure 2:
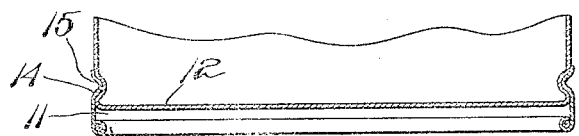
Figure 3:
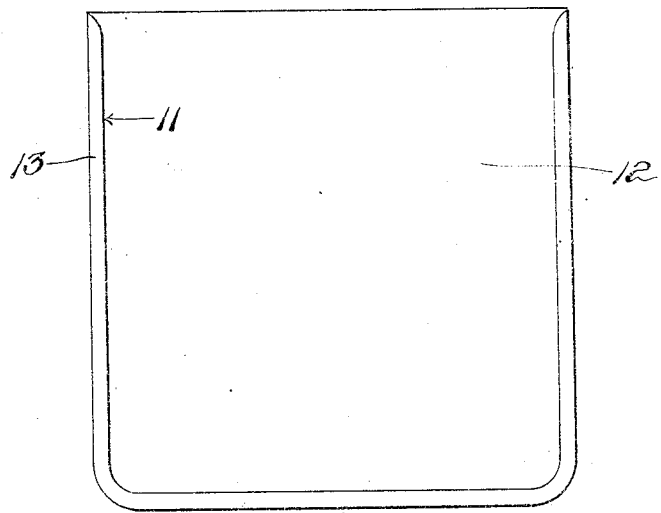

Figure 1 shows my invention in side elevation partly broken away, one of the utensils being shown in heating position and the other utensil in proper position when about to be shoved onto the base; Fig. 2 is an enlarged central vertical sectional view of the bottom of one of the utensils; and Fig. 3 is a bottom plan view of one of the utensils.

The base or stove portion 1 of the apparatus may be of any desired shape, containing resistance wires 2 set in porcelain or other insulating and heat transmitting substance 3, the wires being tapped to the instrument at 4 in usual manner. The top of the instrument consists of a smooth horizontal plate 5 having a projecting flange 6 extending entirely around the periphery of the stove or heater. Coöperating with this flange are a plurality of utensils 7, 8, the former being a tea-pot or coffee-pot and the latter a stew pan or water heater and provided respectively with handles 9, 10, each having a base conforming in peripheral outline to the configuration of one end of the heater plate 5, preferably rectangular. The base has a peripheral groove or slideway 11 open entirely as shown best in Fig. 2, formed preferably by the bottom 12 of the utensil and a bead 13 of a flange 14 which is crimped, and preferably soldered to the spun bottom of the utensil at 15. The groove or slideway 11 of the utensil 7 opens rearward and the groove of the utensil 8 opens forward, so that when the user has hold of the handle 10 the utensil 8 will be shoved forward thereby bringing the handle in an outward direction, as distinguished from having the groove open rearward, in which case the handle would interfere with the other utensil, the idea being to have the grooves so arranged in the various utensils which are provided to coöperate with the heater that their handles will project away from the heater and not interfere with each other.

One heater with the flanged base plate can be used with a large number of utensils and the latter need not have any electrical wiring or other expensive portion but simply be provided with suitable grooves fitting endwise over the flanges of the heater plate, so that when a plurality of them are placed on the heater they inclose the latter within the utensil and thereby conserve all the heat, utilize all the heating space of the plate, and do not interfere with each other. By having the flange of the utensil coextensive with its length and the coöperating flange of the heater-top commensurate therewith, means is provided to enable the user to regulate the heating effects with practically any degree of nicety desired. The utensil remains supported and firmly held in snug conductive contact with the heater-top irrespective of the extent to which it is slid onto said top, so that the user may heat it quickly by sliding it entirely on, or slowly by sliding it on to a somewhat less extent, or she may slide it on only just enough to keep it from cooling. The economy and advantage of this arrangement will be obvious from the foregoing description. For instance, the tea having been steeped, the tea-pot may be removed and an oven put in place over that end of the heater or stove while the pot 8 is still being heated. The stove portion although small is capable of accommodating utensils of fairly large dimensions, either one or two at a time, and when said utensils are removed the plane top surface 5 may be used as a toaster, broiler, or the like, when my invention is used in the complete embodiment of its preferred form. I do not intend to be limited however to this preferred form in every detail thereof, as, for example, the sliding feature is of importance and value irrespective of whether the heater or the utensil carries the flange, and irrespective of the construction and shape of said flange. It is essential that the coöperating holding devices shall extend along the two opposite longitudinal sides in the direction of the sliding movement, and although I prefer the construction in which the flange is on the utensil and in which a third side is also provided with said flange, I do not limit my invention thereto in all cases.

Having described my invention, what I claim as new and desire to secure by Letters Patent of the United States is, 1. The combination with a heater provided with a flat top heating plate having electric heating resistance secured to its under side, of a utensil whose contents is to be heated, one of said parts having opposite parallel longitudinal flanges substantially coextensive with the length thereof for embracing and retaining the other part in relative snug sliding engagement in the direction of said longitudinal flanges.

2. The herein described apparatus, consisting of a heater provided with a top heating plate having horizontally projecting longitudinal flanges, of a utensil to be heated by said heater, said utensil having at its lower edge opposite parallel longitudinal holding grooves having a snug sliding fit on the longitudinal flanges of the heater, whereby it may be slid endwise onto the heater and removed therefrom.

3. The combination with a heater provided with a top heating plate having a horizontally projecting peripheral flange, of a utensil whose contents is to be heated having a flanged bottom provided with a holding groove opening at one side and corresponding in shape and fit to said peripheral flange of the heater, whereby it may be slid endwise onto the heater and removed therefrom, said groove and flange coöperating to hold the bottom of the utensil in direct contact with the heating surface of the plate.

4. The herein described apparatus, consisting of a heater having an approximately rectangular top provided with a horizontally extending peripheral flange, and a plurality of utensils each provided with a depending flange open at one end and having a groove corresponding in shape and size to one end of said top, said utensils, when in position on the heater, substantially covering the top thereof.

5. The herein described apparatus, comprising a heater having a flat top whose peripheral edges project slightly around said heater, and two handled utensils each provided with a depending three-sided flange corresponding in shape and size to one end of said top, the flanges of each utensil being provided with internal grooves having a sliding fit on the projecting edges of one end of said top, and having an opening on one side, each handle projecting from its utensil in a direction out of alinement with said opening, whereby when both utensils are slid onto the heater top their handles do not interfere with each other.

In testimony whereof, I have signed my name to this specification, in the presence of two subscribing witnesses.

JAMES I. AYER.

Witnesses:
ELIZABETH M. CONLIN,
DORA A. PROCTOR.